Aug. 25, 1964  E. BIBEN  3,145,603
LABEL FORMING AND FEEDING DEVICE
Filed Jan. 6, 1960  4 Sheets-Sheet 1

INVENTOR.
EDWARD BIBEN
BY
Caesar and Rivise
ATTORNEYS.

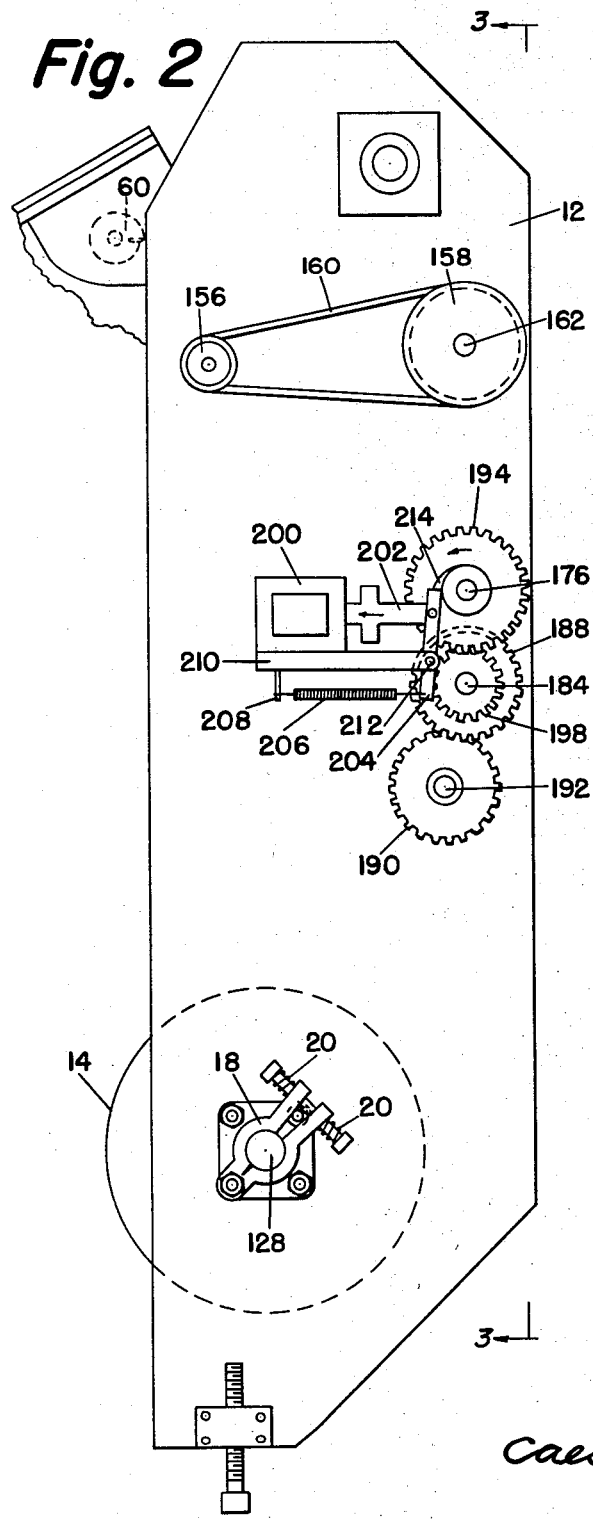
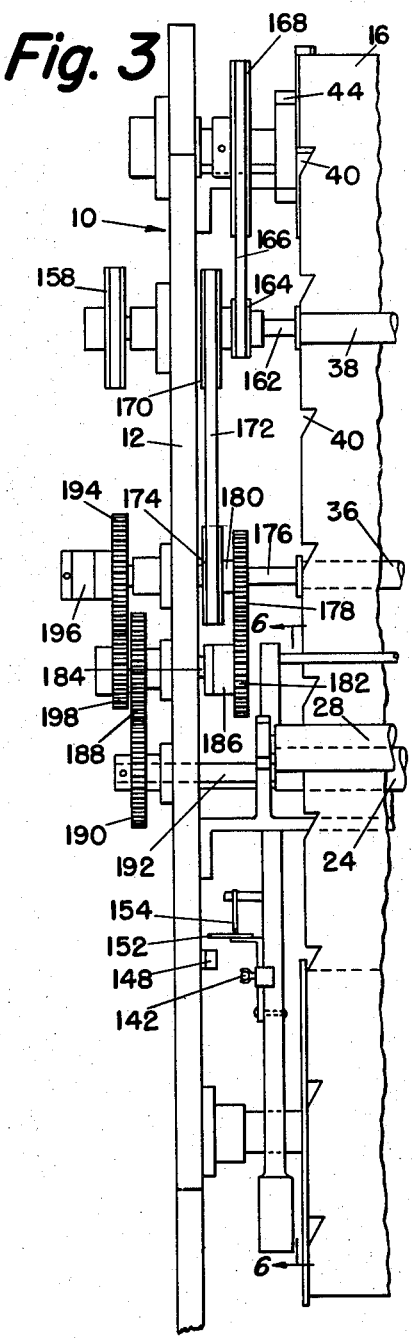

INVENTOR.
EDWARD BIBEN
BY
Caesar and Rivise
ATTORNEYS.

Aug. 25, 1964     E. BIBEN     3,145,603
LABEL FORMING AND FEEDING DEVICE
Filed Jan. 6, 1960     4 Sheets-Sheet 4
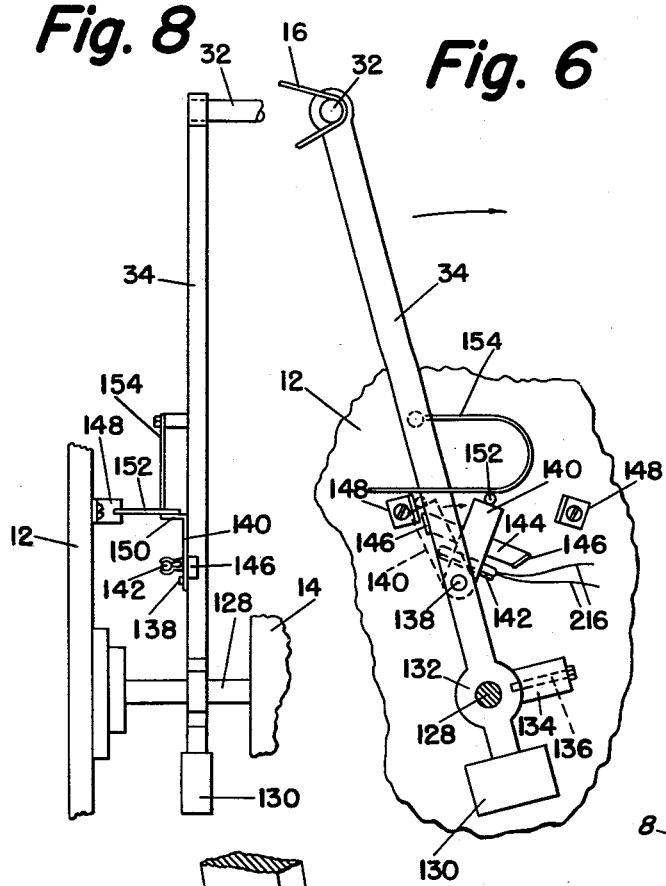
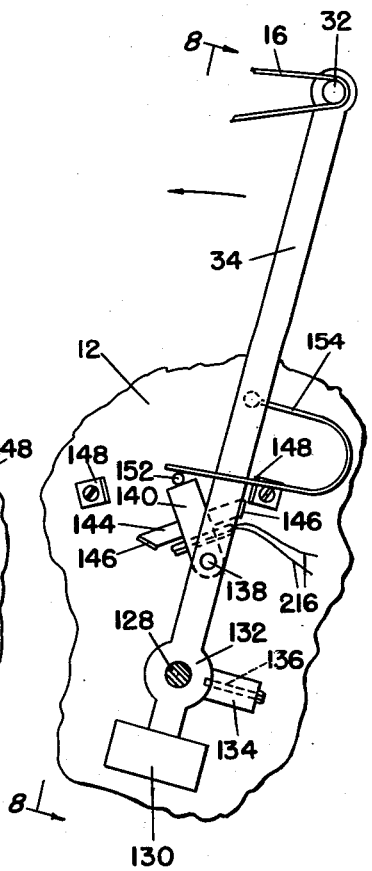
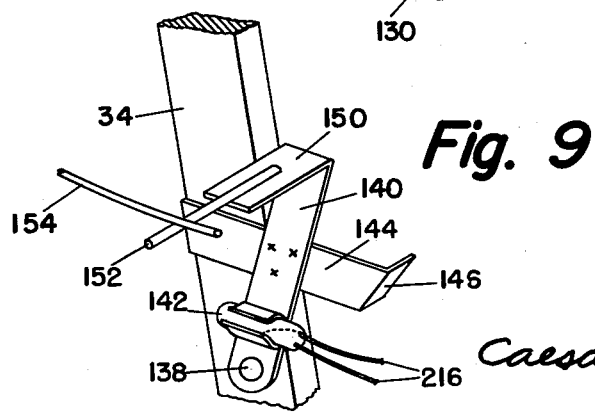
INVENTOR.
EDWARD BIBEN
BY
Caesar and Rivise
ATTORNEYS.

United States Patent Office 3,145,603
Patented Aug. 25, 1964

3,145,603
LABEL FORMING AND FEEDING DEVICE
Edward Biben, Hi-Nella, N.J., assignor to Dumatic Industries, Inc., Philadelphia, Pa., a corporation of Pennsylvania
Filed Jan. 6, 1960, Ser. No. 895
10 Claims. (Cl. 83—154)

This invention relates to a device for forming labels and the like, and it particularly relates to a device for forming labels from a continuous strip.

The machine disclosed herein is particularly utilized in conjunction with the forming of labels for cigarette packages; however, the invention is not limited to this use but may be utilized for various different purposes.

Heretofore, labels for cigarette packages and the like were just individually formed and then placed in a hopper from which they fell onto a feed device. This feed device fed the individual labels onto a conveyor which then carried them to the adhesive applying station.

The separate forming and cutting of the labels into individual entities prior to delivery to the adhesive applying means resulted in a uneconomical duplication of effort and loss of time and labor as well as factory space. These disadvantages could be overcome if it were possible to efficiently feed a continuous strip of pre-printed labels through a cutting device and then onto the conveyor; however, heretofore, it was impossible to efficiently feed the pre-printed strip through the cutter without either bunching or tearing of the strip.

It is one object of the present invention to overcome the aforesaid difficulties by providing a label-strip cutting and feeding device which will efficiently perform its function without bunching or tearing of the strip.

Another object of the present invention is to provide a cutting and feeding device of the aforesaid type which is relatively simple in construction and operation and which is relatively inexpensive to manufacture.

Another object of the present invention is to provide a cutting and feeding device of the aforesaid type which will eliminate uneconomical duplication of effort and waste of time, labor and factory space.

Other objects and many of the attendant advantages of this invention will be readily appreciated as the same becomes better understood by reference to the following detailed description when considered in connection with the accompanying drawings wherein:

FIG. 2 is a side elevational view of the paper feed mechanism as seen from the opposite side shown in FIG. 1.

FIG. 3 is a fragmentary view taken on line 3—3 of FIG. 2.

FIG. 6 is a view taken on line 6—6 of FIG. 3.

FIG. 7 is a view similar to FIG. 6 but showing the actuating arm in the opposite position.

FIG. 8 is a view taken on line 8—8 of FIG. 7.

FIG. 9 is a detailed, perspective view of the mercury switch and its associated elements.

Figure 1:
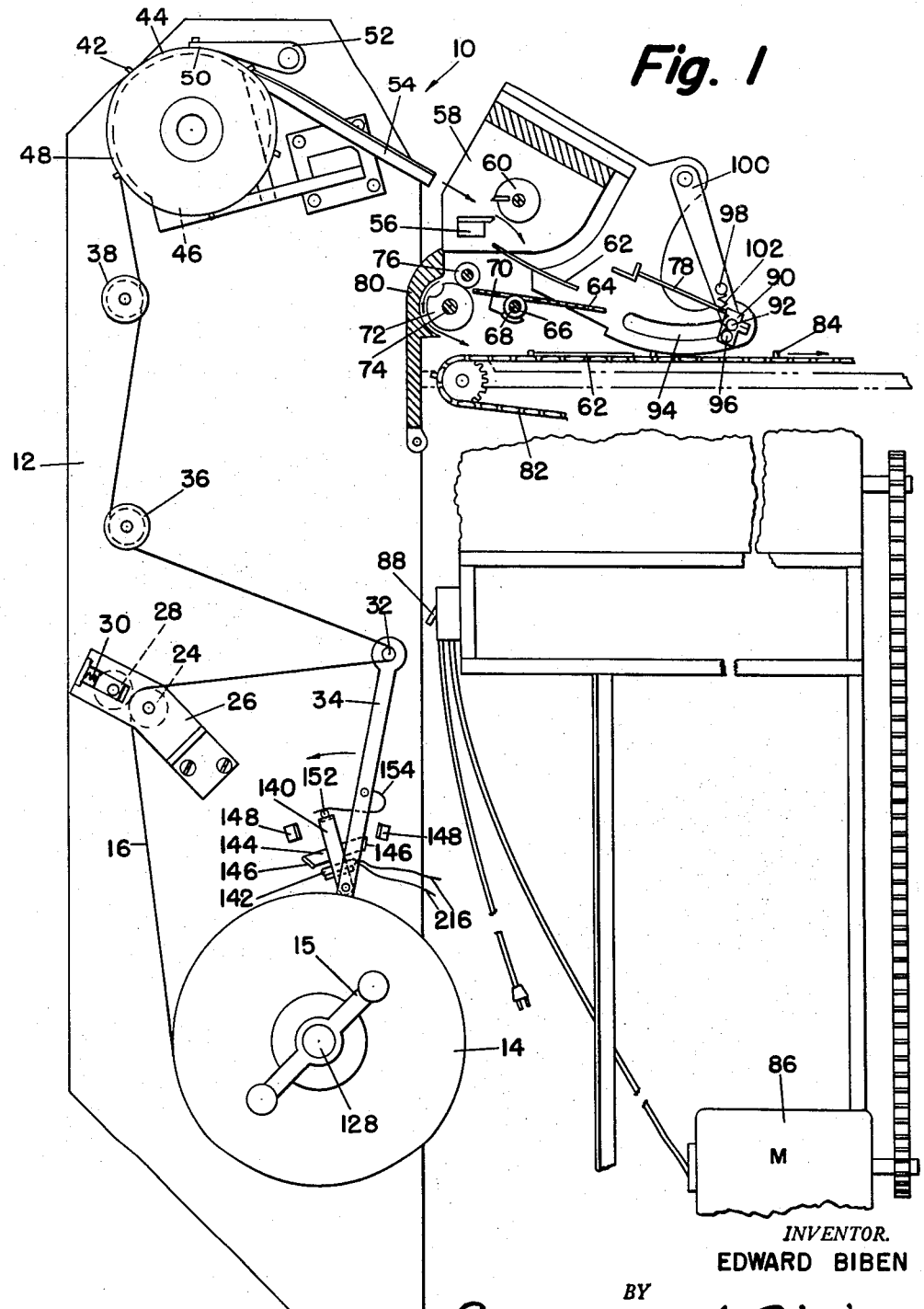
FIG. 1 is a side elevational view, partly broken away, of a device embodying the present invention.

Referring now in greater detail to the various figures of the drawings wherein similar reference characters refer to similar parts, there is shown a machine, generally designated 10, comprising a framework 12 on which is rotatably supported a supply roll 14 for a continuous strip 16 upon which are imprinted a series of labels or the like. The roll 14 is releasably retained in position by means of a wing nut 15. A drag mechanism 18 operated by springs 20 prevent free running of the roll 14 (see FIG. 2).

The strip 16 extends over a feed roll 24 mounted on a bracket 26. Also mounted on bracket 26 is a pressure roll 28 which is urged against the feed roll 24 by a spring 30. The strip, in passing over feed roll 24, is therefore held in frictional contact by pressure roll 28.

After passing over feed roll 24, the strip 16 passes around a roll 32 on the upper end of an arm 34 and then passes over a pair of guide rolls 36 and 38.

The strip 16 is provided with spaced notches 40 along both edges, these notches each having a straight upper edge and an inclined lower edge (as best shown in FIG. 3). These notches are successively engaged by teeth 42 on a driven capstan roll 44. The capstan roll rotates in timed relation to the conveyor mechanism (to be hereinafter described) to feed the strip to the cutting means (to be hereinafter described). The capstan roll 44 itself comprises a stationary central portion 46 with two relatively wide, rotatable discs 48 on each side (as indicated in FIG. 1).

As the strip 16 passes over the capstan roll 44, it is held down by a weight-biased paper weight 50 on one end of a pivoted arm 52 to prevent buckling of paper. This arm holds the strip in position as it passes down through a guide 54 and then over an anvil 56 mounted on the frame 58 of a cutting assembly. As it passes over the anvil 56, the strip is cut into sections by a rotating knife 60. The cut sections, indicated at 62, then fall onto a feed plate 64 having an aperture in alignment with a feed roller 66 mounted on a shaft 68. The roller 66 has a feed pad 70 thereon which, as the roller 66 rotates, extends momentarily through the aperture in the plate 64.

As it does so, it frictionally engages a cut section 62 and moves it between a notched roller 72 mounted on a driven shaft 74 and a pressure roller 76 frictionally driven by roller 72. The shaft 74 is drivingly connected to the motor (hereinafter described). The notch in roller 72 is to permit the end of a cut section 62 to be inserted between the two rollers 72 and 76.

The cut section 62, as it falls onto plate 64, is engaged by spring-biased fingers 78 which assure sufficient frictional contact between the cut section 62 and the pad 70 so that the cut section can be properly fed.

The roller 72 rotates adjacent an arcuate frame portion 80 which is pivoted to the frame so that it can be moved out of the way to clear a jam or for cleaning the roller 72 and coacts therewith to pass the cut sections 62 in a reverse direction onto an endless chain or belt conveyor 82 having feed lugs 84 spaced apart a distance slightly larger than the length of a cut section 62. The conveyor 82 then carries the cut section 62 to a gluing station (not shown) where adhesive is applied to the individual cut sections each of which forms a label.

The entire machine, including the various elements described above, is driven from the motor 86 controlled by switch 88.

The fingers 78 (of which there are two in number, although either only one or more than two may be used within the scope of the invention) are connected to a block 90 mounted on a shaft 92 which passes through an arcuate slot 94 in an extension of the frame portion. On the block 90 is a pin 96 between which and a pin 98 on an oscillating arm 100 is positioned an over-center spring 102. This spring retains the fingers in either the operative or inoperative positions until positively moved by their actuating mechanism. The shaft 92 is supported by the oscillating arm 100.

Figure 4:
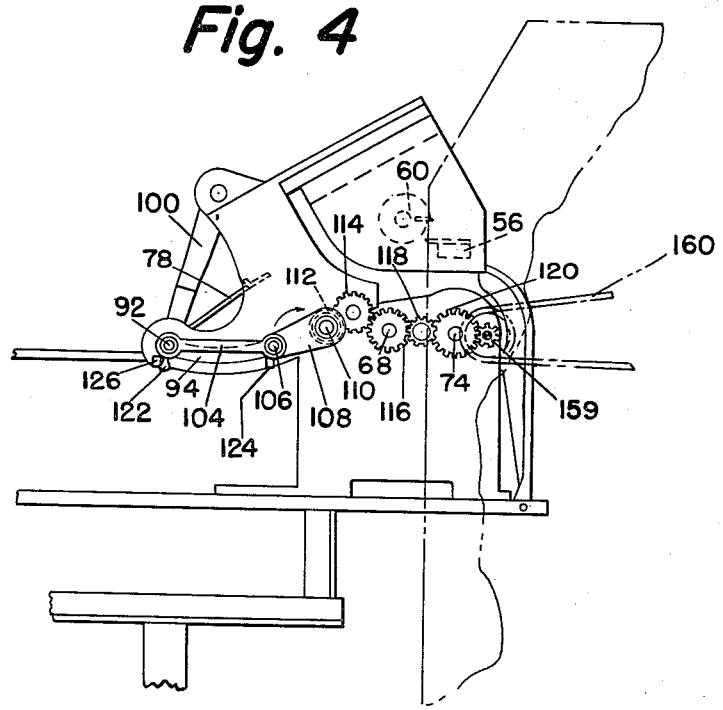
FIG. 4 is a detailed, side elevational view of the paper cutting and depositing mechanism viewed from same side as FIG. 2.
Figure 5:
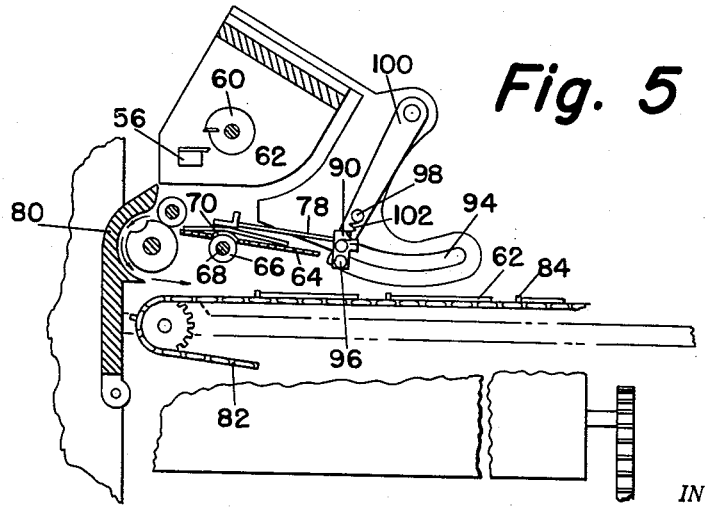
FIG. 5 is a sectional view of the paper cutting and depositing mechanism as shown in FIG. 1 with the moving elements shown in advanced or opposite position.

The actuating mechanism for the fingers 78 comprises a link 104 pivotally connected at one end to shaft 92 and at the other end to a pivot pin 106 (see FIG. 4). Also connected to pin 106 is a crank arm 108 which is secured at its other end on a rotating shaft 110 mounted on the frame of the machine. The shaft 110 supports a gear 112 which meshes with gear 114. The gear 114, in turn, meshes with a gear 116 mounted on shaft 68. The gear 116 is in mesh with a gear 118 which, in turn, meshes with a gear 120 mounted on the shaft 74. By means of said gears the rollers 66 and 72 and the cooperating fingers 78 operate synchronously.

Also connected to shaft 92 is a finger 122 (see FIG. 4). This finger is adapted to coact with a pair of stops 124 and 126 on opposite ends of the arcuate slot 94.

In operation, as the gear 74 rotates, it drives the gear 116 and the gear 112. As the gear 112 rotates, it operates the crank arm 108 to move the link 104 back and forth. This oscillates the shaft 92 within the arcuate slot 94. During this oscillation, the finger 122 strikes the stop 124. Further oscillating or linear movement of the shaft 92 causes it to rotate under the continued force exerted by crank arm 108. This causes the block 90 to pivot, thereby pivoting the fingers 78 against the cut section 62 held on the plate 64. In the reverse movements of crank arm 108, the shaft 92 moves to the opposite end of the slot 94 until finger 122 abuts stop 126. During continued movement of crank arm 108, the shaft 92 rotates to raise the fingers 78 away from the plate 64. In either the raised or lowered position, the over-center spring 102 acts to retain the fingers in that position.

In operating the above-described machine, there would normally be a tendency for the strip 16 to tear as it is fed from the roll 14 to the capstan roll 44. This would be due to the fact that too great a tension is required to rotate a full roll of paper such as roll 14 would be initially. In order to overcome this tension problem there is provided a sensing and compensating mechanism for the feed roll which includes the arm 34 pivotally mounted on the shaft 128 which also supports the roll 14. At the upper end of arm 34 is the roll 32 while at the lower end of the arm 34 is a balance weight 130. Also on the arm 34 and extending laterally from the bearing portion 132 thereof is a counterweight 134 held by a bolt 136. The balance weight 130 acts to balance the arm 34 and everything connected thereto so that the arm is, in effect, weightless. The counterweight 134 acts to counterbalance the tension of strip 16 in order to keep the roller 32 against the strip.

Pivoted at 138 on the arm 34 is a finger 140 to which is secured a mercury switch 142. Also secured to the finger 140 is a transverse bracket 144 having a flange 146 at each end. A pair of stops 148 is provided on the frame.

The finger 140 is further provided at its upper end with a lateral flange 150. To this flange 150 is secured a rod 152 and pressing against this rod is a bowed hair spring 154 attached to the arm 34. This hair spring 154 is movable between the stops 148. This spring also, by pressing against the rod 152, keeps the finger 140 and the mercury switch carried thereby from bouncing during pivotal movement thereof. It also acts to provide a snap action for these parts.

In operation, the arm 34 is constantly in pivotal movement in one direction or the other depending on the speed of rotation of the feed roll 24. When the feed roll 24 rotates faster than the capstan roll 44, the strip is looser and the arm 34 moves to the right, as viewed in FIG. 1. When it moves far enough to the right, the rod 152 strikes the right hand stop 148: thereafter, with continued movement of the arm 34 to the right, the finger 140 pivots to the left and this leftward motion is of the snap type under the influence of spring 154.

As soon as the finger 140 is snapped into the reverse inclination (as shown in FIG. 7), the mercury switch is tilted in the opposite direction. This affects a two-speed drive system (hereinafter more fully described) to rotate the feed roll at a slower rate than the capstan roll. This makes the strip more taut and results in a gradual pulling of the arm 34 to the left, as viewed in FIG. 1. When it moves far enough to the left for the rod 152 to strike the left hand stop 148, the finger 140 is snapped into the opposite inclination and the cycle is then repeated.

The two-speed drive mechanism comprises a power roller 156 (note FIG. 2) which is connected to the motor 86 by appropriate means such as a drive belt, gearing or any other desired standard mechanism. The power pulley 156 is operatively connected to drive pulley 158 by a timing belt 160. It is also drivingly connected to the shaft 74 on which is mounted notched roller 72. It also actuates gear 159 (operatively connected to the drive sprocket of conveyor 82) through gear 120, thereby driving the conveyor 82 in timed relation therewith.

The pulley 158 is mounted on shaft 162 on which is also mounted the guide roller 38. The shaft 162 additionally carries a pulley 164 (see FIG. 3) operatively connected by a timing belt 166 to a pulley 168. This pulley 168 acts as a constant speed drive for the capstan roll 44.

Also mounted on shaft 162 is a pulley 170 connected by a timing belt 172 to a pulley 174 on a shaft 176. The shaft 176 supports the guide roll 36 and also supports a gear 178, this gear 178 and pulley 174 being connected together by sleeve 180. The gear 178 is in mesh with a gear 182 in a 1:1 ratio. The gear 182 is mounted on a shaft 184 by means of an overrunning clutch 186. The shaft 184 also supports a gear 188 which is in mesh with a gear 190 in 1:1 ratio, this gear 190 being mounted on a shaft 192. The shaft 192 supports the feed roll 24.

The shaft 176 further supports a gear 194 which is mounted thereon by an overrunning clutch 196. This gear 194 is larger than gear 178 and meshes with a gear 198 coaxial with the gear 188 on the shaft 184.

The overrunning clutches 186 and 196 are of standard construction and permit their corresponding gears 182 and 194 to selectively be placed in driving position while the other gear is idling. In this manner, the gears 178 and 194 can be selectively used to drive the feed roll 24 either slower or faster.

The engagement and disengagement of the clutch 196 is controlled by a solenoid 200 (see FIG. 2) having a plunger 202 to the free end of which is pivoted a pawl 204. The lower end of pawl 204 is connected to one end of a spring 206 having its other end connected to a finger 208 on a supporting arm 210. The pawl 204 is pivotally connected to the arm 210 at 212.

The pawl 204 coacts with a one-tooth ratchet or detent 214 on the clutch 196 to retain this clutch against rotation. In this position, the overrunning clutch 196 permits the gear 194 to idle. This is the normal position of the solenoid plunger when the solenoid is unenergized and represents the slow position of the machine. When the solenoid is energized, the plunger 202 is moved out of the path of the ratchet 214. This permits the gear 194 to rotate and act as the drive means. When the gear 194 is in this drive position, the overrunning clutch 186 causes the gear 182 to idle. This represents the fast position of the machine.

The energization and de-energization of the solenoid is controlled by the tilting of the mercury switch 142 which is connected to the solenoid by wires 216. The tilting of the mercury switch, in turn, depends on the position of the arm 34, as described above. The mercury switch is tilted in the unenergized position when the arm 34 is at the right, as viewed in FIG. 1, and is in the energized position when the arm 34 is at the left, as shown in FIG. 6.

Obviously many modifications and variations of the present invention are possible in the light of the above teachings. It is, therefore, to be understood that within the scope of the appended claims, the invention may be practiced otherwise than as specifically described.

What is claimed as the invention is:

1. In a label forming device for forming individual labels from a continuous strip of printed labels comprising a frame, a feed roll on said frame, drive means operatively connected to said feed roll for continuous rotation of said feed roll at selectively variable speeds, a supply roll supporting shaft on said frame, said shaft being constructed to releasably support a supply roll having a continuous strip wound thereon, said shaft also rockably supporting a control arm, said control arm having an idler roll at one end and a mercury switch intermediate its ends, said mercury switch being mounted on a finger which is itself pivotally connected to said control arm, a transverse bracket on said finger, a lateral flange on each of the opposite ends of said bracket, a pair of stops on said frame, said stops being on opposite sides of said control arm and in a position where they may be engaged by an abutment means on said finger upon corresponding rocking movement of said control arm, and a spring on said arm, said spring being in engagement with said finger and exerting a force radial to the pivot of said finger whereby it acts to snap said finger into opposite pivoted positions upon movement of said finger beyond its dead center position in either direction, said mercury switch being in electrical circuit with a solenoid, said drive means being operatively connected to two sets of gears, one of said sets of gears being constructed and arranged to drive said feed roll relatively slow and the other of said sets of gears being constructed and arranged to drive said feel roll relatively fast, a clutch means to selectively and alternatively engage and disengage said sets of gears to and from operative connection with said drive means, said solenoid having a plunger in operative connection with said clutch means, and said plunger being actuated into clutch engaging and disengaging positions by movement of said control arm and the mercury switch thereon.

2. In the label forming device of claim 1, a counterweight on said control arm constructed to counterbalance the weight of said control arm and all elements supported thereby, and a balance weight on said control arm to couterbalance the tension of a strip engageable around the idler roll on said control arm.

3. A label forming device comprising a frame, a support on said frame for supporting a rotatable supply roll having a strip wound thereon, a control arm pivotally connected to said frame for rocking movement relative thereto, said control arm having an idler roll at its free end, a feed roll on said frame, a constant speed drive roll on said frame in spaced relation to said feed roll, a cutting means on said frame in spaced relationship to said drive roll, said cutting means being constructed to sever said strip transversely of its length to cut individual labels therefrom, and a label removal means on said frame, a drive means operatively connected to said feed roll, drive roll, cutting means and label removal means, said drive means being connected to said drive roll, cutting means and label removal means for constant speed, synchronous actuation thereof and being connected to said feed roll for continuous but variable-speed actuation thereof, the idler roll on said control arm being positioned for engagement by said strip and said control arm being constructed and arranged to be rocked on its pivotal axis by the force exerted by said strip corresponding to the tension thereon, said control arm having an actuating means thereon movable with said arm between two opposite positions of actuation, means operatively connecting said actuating means to said drive means for actuation of said drive means, said actuating means being constructed and arranged to remain inoperative until it reaches either of said positions of actuation and to become operative to actuate said drive means upon reaching either of said positions, said actuating means being constructed to actuate said drive means to rotate said feed roll at one speed when said actuating means is at one of said positions and at another speed when said actuating means is at the other of said positions, and means operatively connected to said actuating means for snapping said actuating means into operative condition as soon as it reaches one of said positions.

4. The label forming device of claim 3 wherein said drive roll is provided with teeth for engaging notches on an edge of the strip.

5. The label forming device of claim 3 wherein said feed roll is operatively and selectively connected to said drive means by means of two sets of gears, one of said sets of gears being constructed and arranged to drive said feed roll relatively slow and the other of said sets of gears being constructed to drive said feed roll relatively fast, a clutch means to selectively and alternatively engage and disengage said sets of gears to and from operative connection with said drive means, and said actuating means on said control arm being in operative connection with a clutch operating means to operate said clutch means in accordance with the rocked position of said control arm.

6. The label forming device of claim 5 wherein said actuating means includes a mercury switch on said control arm, said mercury switch being electrically connected to said clutch operating means, said clutch operating means comprising a solenoid, and said solenoid having a plunger provided with a pawl, said pawl being releasably engageable with a detent connected to said clutch means to retain said clutch means inoperative and thereby to prevent driving rotation of said other set of gears and being movable away from engagement with said detent upon movement of said solenoid plunger.

7. The label forming device of claim 6 wherein said plunger is biased into a normal position in which said pawl is in engagement with said detent and is movable into a disengaged position upon energization of said solenoid.

8. The label forming device of claim 3 wherein said label removal means comprises a plate for receiving cut labels as they fall from said cutting means, a feed means associated with said plate, said feed means being operatively connected to said feed roll for synchronous movement therewith, a notched roller operated in synchronism with said feed means, a presser roller operated in synchronism with said notched roller and in rotatable contact therewith, and conveying means adjacent to and operated in synchronism with said notched roller, said feed means being actuatable to feed successive cut labels between said notched roller and said presser roller, said notched roller then acting to deliver said labels to said conveying means.

9. The label forming device of claim 8 wherein at least one pivoted weight is movable onto each successive cut label as it rests on said plate, said weight being movable in timed relationship with said feed means and said notched roller.

10. The label forming device of claim 8 wherein said feed means comprises a roller having a pad thereon, said pad being movable into and out of an aperture in said plate upon rotation of its roller.

(References on following page)

References Cited in the file of this patent

UNITED STATES PATENTS

| | | |
|---|---|---|
| 1,206,880 | Mattingly | Dec. 5, 1916 |
| 1,310,923 | Novick | July 22, 1919 |
| 1,380,710 | Goben | June 7, 1921 |
| 1,691,027 | Novick | Nov. 6, 1928 |
| 1,791,144 | Ranney | Feb. 3, 1931 |
| 1,902,755 | Biggs | Mar. 21, 1933 |
| 1,940,484 | Barber | Dec. 19, 1933 |
| 1,964,874 | Fankboner | July 3, 1934 |
| 2,166,551 | Perry | July 18, 1939 |
| 2,168,023 | Dymeck | Aug. 1, 1939 |
| 2,214,609 | Drake | Sept. 10, 1940 |
| 2,390,907 | Winter | Dec. 11, 1945 |
| 2,393,015 | Bendz | Jan. 15, 1946 |
| 2,670,906 | Daniels et al. | Mar. 2, 1954 |
| 2,737,354 | Trofimov | Mar. 6, 1956 |
| 2,808,884 | Shann | Oct. 8, 1957 |
| 2,825,016 | Bailey | Feb. 25, 1958 |